(12) United States Patent
Nagy

(10) Patent No.: US 11,911,712 B2
(45) Date of Patent: Feb. 27, 2024

(54) METHOD FOR PREPARING AQUEOUS SOLUTIONS OF A DEFINED pH

(71) Applicant: Fujifilm Diosynth Biotechnologies UK Limited, Billingham (GB)

(72) Inventor: Tibor Nagy, Billingham (GB)

(73) Assignee: Fujifilm Diosynth Biotechnologies UK Limited, Billingham (GB)

(*) Notice: Subject to any disclaimer, the term of this patent is extended or adjusted under 35 U.S.C. 154(b) by 580 days.

(21) Appl. No.: 16/652,204

(22) PCT Filed: Sep. 21, 2018

(86) PCT No.: PCT/GB2018/052687
§ 371 (c)(1),
(2) Date: Mar. 30, 2020

(87) PCT Pub. No.: WO2019/069046
PCT Pub. Date: Apr. 11, 2019

(65) Prior Publication Data
US 2020/0238196 A1    Jul. 30, 2020

(30) Foreign Application Priority Data
Oct. 4, 2017 (GB) .................................... 1716175

(51) Int. Cl.
| | |
|---|---|
| *B01D 15/16* | (2006.01) |
| *G01N 30/34* | (2006.01) |
| *G05D 21/02* | (2006.01) |
| *B01F 25/42* | (2022.01) |
| *B01F 35/221* | (2022.01) |
| *B01F 35/71* | (2022.01) |

(52) U.S. Cl.
CPC ............ *B01D 15/168* (2013.01); *B01F 25/42* (2022.01); *B01F 35/2211* (2022.01); *B01F 35/7176* (2022.01); *G01N 30/34* (2013.01); *G05D 21/02* (2013.01)

(58) Field of Classification Search
None
See application file for complete search history.

(56) References Cited

U.S. PATENT DOCUMENTS

| | | | |
|---|---|---|---|
| 6,221,250 B1 | 4/2001 | Stafstrom | |
| 2016/0282318 A1* | 9/2016 | Malmquist | ......... G01N 30/8624 |
| 2017/0292937 A1* | 10/2017 | Carredano | .......... B01F 35/2132 |

FOREIGN PATENT DOCUMENTS

EP    2269055 A1    1/2011

OTHER PUBLICATIONS

Jan. 29, 2019 (WO) International Search Report PCT/GB2018/052687.

\* cited by examiner

*Primary Examiner* — Richard C Gurtowski
(74) *Attorney, Agent, or Firm* — Banner & Witcoff, Ltd.

(57) ABSTRACT

A method for preparing an aqueous solution of a defined pH comprising an acid, a base and optionally one or more additives is provided. The method comprises the steps of:
a) calculating the theoretical concentrations of acid and base for the solution to have the defined pH using the Henderson-Hasselbach equation in combination with the Debye Huckel theory for a range of different additive concentrations; b) preparing a sample of the buffer for the range of additive concentrations and measuring the actual pH for each additive concentration; c) calculating a value for delta pH, $\Delta pH$, being the difference between the theoretical pH and the actual pH, for each additive concentration; d) generating a mathematical model describing the relationship of $\Delta pH$ with additive concentration; e) selecting the defined pH and additive concentrations; f) using the mathematical model generated in step d) to calculate $\Delta pH$ for the defined pH and additive concentration; g) calculating a $\Delta pH$-corrected pH by summing the defined pH and delta pH; h) using the $\Delta pH$-corrected pH to calculate the concentrations of acid and base using the Henderson-Hasselbach equation in combination with the Debye Huckel theory; i) preparing the solution using the concentrations calculated in step h).

32 Claims, No Drawings

METHOD FOR PREPARING AQUEOUS SOLUTIONS OF A DEFINED pH

RELATED APPLICATIONS

This application is a National Stage Application under 35 U.S.C. 371 of co-pending PCT application PCT/GB2018/052687 designating the United States and filed Sep. 21, 2018; which claims the benefit of GB application number 1716175.3 and filed October 4, each of which are hereby incorporated by reference in their entireties.

The present invention concerns methods for the preparation of aqueous solutions, especially buffer solutions.

Buffer solutions are widely employed in many industries in both research and in manufacturing. Whilst many different buffer solutions are available, the key parameter of these solutions is the pH of the solution. As many buffer solutions are relatively dilute, but may be required in relatively large volumes, and further, given the range of buffers that may be required, for logistical reasons it is not practical to store the quantities of ready-made buffer solutions. Accordingly, it is desirable to be able to calculate the proportions of components necessary to given a buffer composition of a given pH such that quantities of the correct buffer can be prepared as and when such buffer is required. Whilst at a basic level, this appears a straightforward matter, in fact the actual pH achieved does not routinely correspond with the theory, even using the standard Henderson-Hasselbach equation in combination with the Debye Huckel theory, or using the many variants and modification proposed to compensate for, for example, the effects of the size of ions, the charge of the ions, the temperature of the buffer and especially the nature and concentration of buffer additives, such as salts, especially neutral salts, chaotropes, chelating agents, surfactants and carbohydrates. Numerous attempts to provide reliable methods for preparing buffer solutions have been proposed, for example the methods proposed in WO2009/131524, and the prior art acknowledged therein.

According to a first aspect of the present invention, there is provided a method for preparing an aqueous solution of a defined pH comprising an acid, a base and optionally one or more additives, the method comprising the steps of:
a) calculating the theoretical concentrations of acid and base for the solution to have the defined pH using the Henderson-Hasselbach equation in combination with the Debye Huckel theory for a range of different additive concentrations;
b) preparing a sample of the buffer for the range of additive concentrations and measuring the actual pH for each additive concentration;
c) calculating a value for delta pH, $\Delta$pH, being the difference between the theoretical pH and the actual pH, for each additive concentration;
d) generating a mathematical model describing the relationship of $\Delta$pH with additive concentration;
e) selecting the defined pH and additive concentrations;
f) using the mathematical model generated in step d) to calculate $\Delta$pH for the defined pH and additive concentration;
g) calculating a $\Delta$pH-corrected pH by summing the defined pH and delta pH;
h) using the $\Delta$pH-corrected pH to calculate the concentrations of acid and base using the Henderson-Hasselbach equation in combination with the Debye Huckel theory;
i) preparing the solution using the concentrations calculated in step h).

It will be recognised that in the method of the first aspect of the present invention, in some embodiments, step a) may precede step b) and in other embodiments, step b) may be carried out prior to step a).

According to a second aspect of the present invention, there is provided a method for preparing an aqueous solution of a defined pH comprising an acid, a base and optionally one or more additives, the method comprising the steps of:
a) calculating the theoretical concentrations of acid, base and additives for the solution to have the defined pH using the Henderson-Hasselbach equation in combination with the Debye Huckel theory for a range of different additive concentrations;
b) calculating a value for $\Delta$pH, being the difference between the theoretical pH and a value, preferably a predetermined value, for the actual pH, for each additive concentration;
c) generating a mathematical model describing the relationship of $\Delta$pH with additive concentration;
d) selecting the defined pH and additive concentration;
e) using the mathematical model generated in step c) to calculate $\Delta$pH for the defined pH and additive concentration;
f) calculating a $\Delta$pH-corrected pH by summing the defined pH and $\Delta$pH;
g) using the $\Delta$pH-corrected pH to calculate the concentrations of acid and base using the Henderson-Hasselbach equation in combination with the Debye Huckel theory;
h) preparing the solution using the concentrations calculated in step g).

According to a third aspect of the present invention, there is provided a method for preparing an aqueous solution of a defined pH, comprising an acid, a base and an additive, the method comprising the steps of:
a) calculating the theoretical pH for the solution using the Henderson-Hasselbach equation in combination with the Debye Huckel theory;
b) calculating a $\Delta$pH-corrected pH for the aqueous solution by comparing the theoretical pH with a pH value calculated from an equation determined from a mathematical model of the difference between the theoretical pH and a value, preferably a predetermined value, for the actual pH of the aqueous solution for a range of additive concentrations;
c) using the $\Delta$pH-corrected pH to calculate the concentrations of acid and base using the Henderson-Hasselbach equation in combination with the Debye Huckel theory;
d) preparing the solution using the concentrations calculated in step c).

Aqueous solutions which can be prepared by the method of the present invention are most commonly buffers, especially buffers employed in the fields of chemistry and biotechnology, and most especially in the processing of biomolecules. Buffers which can be prepared by the method of the present invention include tris buffers [(tris(hydroxymethyl)aminomethane ("tris") in combination with a tris acid salt, such as tris.HCl); sodium phosphate buffer (disodium phosphate as base and sodium dihydrogen phosphate as acid); potassium phosphate buffer (dipotassium phosphate as base and potassium dihydrogen phosphate as acid); sodium acetate buffer (sodium acetate as base and acetic acid as acid; MES buffer (4-Morpholineethanesulfonic acid sodium salt as base and 4-Morpholineethanesulfonic acid as acid); and HEPES buffer (4-(2-Hydroxyethyl)piperazine-1- ethanesulfonic acid sodium salt as base and 4-(2-Hydroxyethyl)piperazine-1-ethanesulfonic acid as acid).

In many instances for the processing of biomolecules, the pH of the solution is selected to be in the range of from 3.5 to 9. In many embodiments, the pH is selected to be within 1 unit of the thermodynamic pKa value for the solution.

Additives that may be present in the solutions are water-soluble additives, and include salts, chaotropes, chelating agents, surfactants, solvents and carbohydrates, examples of which are well known in the field of chemistry and biotechnology. Mixtures of two or more additives may be present.

Salts that can be employed as additives include neutral salts, such as NaCl, KCl, $Na_2SO_4$ and non-neutral salts such as $(NH_4)_2SO_4$ and $(NH_4)_3PO_4$. When salts are employed as additives, they are commonly employed at a concentration of up to about 5M, such as up to about 2M.

Chaotropes that can be employed as additives include urea and guanidine hydrochloride Chelating agents that can be employed as additives include EDTA and EGTA.

Surfactants that can be employed as additives include especially non-ionic surfactants such as alkylphenolethoxylates, for example octyl and nonylphenol ethoxylates, for example Triton(R) X100, and polysorbates such as polysorbate 80.

Solvents that can be employed as additives are preferably water-miscible solvents, and includes short chain alcohols, such as methanol, ethanol or isopropanol, acetonitrile, acetone, glycols, such as ethylene glycol, and water miscible poly(ethylene glycols).

Carbohydrates that can be employed as additives include monosaccharides, for example glucose and fructose and oligosaccharides for example maltose, lactose and sucrose.

Chaotropes, chelating agents, surfactants, solvents and carbohydrates when present are commonly employed at concentrations of up to 1M, such as up to 500 mM, especially up to 250 mM, for example from 1 to 100 mM.

When the aqueous solution is employed in the processing of biomolecules, the biomolecules are commonly polynucleotides or polypeptides, especially recombinant polypeptides including antibodies and other therapeutic polypeptides. The aqueous solutions may be employed in the culturing of recombinant host cells expressing recombinant polypeptides, especially prokaryotic host cells, such as *E. coli*, and eukaryotic host cells such as CHO cells. The aqueous solutions are particularly commonly employed in the purification of polypeptides expressed in recombinant host cells. It will be recognised that the aqueous solutions can readily be employed in the isolation, expression or purification of any biomolecules requiring the use of such an aqueous solution.

The range of additive concentrations, and the number of data points within that range, employed in the method of the present invention is selected at the discretion of the user. In many embodiments, the minimum additive concentration is selected to be below, and the maximum additive concentration is selected to be above, the additive concentration of the target solution. In certain embodiments, the present invention may be employed for aqueous solutions free from additives, in which case, the minimum additive concentration is either zero or higher, such as no more than 1 mM higher, than the additive concentration desired for the target solution.

In many instances, the number of data points in the range of additive concentrations is less than 20, very often up to 15, for example from 5 to 10.

In certain embodiments, the data points are selected to be more closely spaced at the lower end of the additive concentration range than at the upper end of the range. In some instances, up to about 80% of the data points are located in the lowest 25% of the concentration range. In certain instances, the interval between data points is calculated by selecting the lowest concentration in the range, A, selecting the next lowest concentration in the range, B, subtracting A from B, multiplying the difference by 2 to calculate the interval to the third concentration, and calculating C by adding the interval to B. The process can be repeated using concentrations C and B to calculate the concentration for the fourth data point, D, and so on for the desired number of data points across the selected range.

In other embodiments, the data points are distributed evenly across the data range.

In some embodiments, the method of the present invention can be repeated for a range of different concentrations of a given acid and base, and the data generated can be used to generate a mathematical model of the variation of pH against acid and base concentration and additive concentration. The mathematical model can then be employed to calculate the composition of solutions for other concentrations of those acids, bases and additives, preferably concentrations within the range which was employed to generate the data used to generate the mathematical model.

The Henderson-Hasselbach equation employed in the method of the present invention is commonly expressed as $pH = pK_a + \log([A^-]/[HA])$ where $[A^-]$ is the molar concentration of the base component of the solution, and $[HA]$ is the molar concentration of the acid component of the solution.

Any of the variations of the Debye Huckel theory equations can be employed in the present invention. In many embodiments, the equations employed are as follows.

The value of pKa employed in the Henderson-Hasselbach equation is preferably corrected for temperatures other than 25° C., $pKa_T$, using the equation:

$pK_{aT} = pK_a + (dpK_a/dT) \times (T-25)$ where pKa is the thermodynamic pKa, and the values of $dpK_a/dT$ employed are calculated using methods known in the art, or are selected from the open literature and T is temperature in ° C.

The value of pKa employed is the Debye-Huckel modified pKa (pKa') which is calculated by the equations:

$$pKa' = pKa + (2Z - 1)\left(\frac{A\sqrt{I}}{1 + \sqrt{I}} - 0.1I\right)$$

where Z is the charge on the acidic species, A is the Debye-Huckel parameter and I is the ionic strength. In many embodiments, the value of pKa employed is the Debye-Huckel modified pKa corrected for temperature ($pKa_T'$) which is calculated using the same equation except employing the temperature-corrected pKa, $pKa_T$, instead of the theoretical pKa.

The Debye-Huckel parameter, A, is calculated from the equation:

$A = (0.4918 + 0.0006614\ T + 0.000004975\ T^2)$ where T is the temperature in ° C.

The ionic strength, I, may be calculated solely considering the ionic strength of the additives, and calculated the equation:

$I = \frac{1}{2}\sum_{i=1}^{n}(CiZ_i^2)$ where Ci is the molar concentration of each species in solution, and $Z_i$ is the net charge of each species in solution. In preferred embodiments, the ionic strength also includes the contribution of the acid and base, calculated using the same equation as employed for the additives.

It will be recognised that because the value of the modified pKa ($pK_a'$ or the temperature corrected $pK_aT'$) is dependent upon the ionic strength, and that the ionic strength is also dependent upon the concentrations of the acid and base, the use of the Debye-Huckel and Henderson-Hasselbach equations to calculate concentrations to achieve a given pH involves an iterative calculation of the value of the modified $pK_a$. The iterative calculation is repeated until the value of the modified $pK_a$ is less than a predetermined difference from the previously calculated iteration of the modified $pK_a$. In many instances, this difference is selected to be <0.01, such as <0.001, and preferably <0.0001. The value of the modified $pK_a$ that meets this difference parameter is the value that is employed to calculate the acid and base concentrations of the solution.

An example of the iterative calculation process is as follows:
 a) Calculate the temperature corrected pKa, $pKa_T$, using the equation:

$$pKa_T = (pKa + (dpKa/dt*(T-25)))$$

b) Calculate the additives ionic strength, $I_{add}$ using the equation:

$$I_{add} = \frac{1}{2}\Sigma_{i=1}^{n}(C_i Z_i^2)$$

c) Calculate the ionic strength due to the acid and base, $I_b$, for the given pH, using the value of $pKa_T$ calculated in step a) using the equations:

$$pH = pKAT + \log 10 \frac{[A-]}{[HA]} \text{ and } R = \frac{[A-]}{[HA]};$$

where [A−] is the molar concentration of the base component of the buffer, and [HA] is the molar concentration of the acid component of the buffer
therefore pH=pKaT+log 10 R;
and so pH−pKaT=log 10 R;
thus $10^{pH-pKaT} = R$;

$$\text{Acid ratio = acid counter ion ratio} = \frac{1}{1+R}$$

$$\text{Base ratio = base counter ion ratio} = \frac{R}{1+R}$$

$$I_b = \frac{1}{2}\sum_{i=1}^{n}(C_i Z_i^2)$$

d) calculate the temperature-corrected Debye Huckel modified $pKa_T'$ with the combined ionic strength due to acid, base and additive, $I_{sum} = (I_b + I_{add})$ $$A = \left(0.4918 + 0.0006614\ T + 0.000004975\ T^2\right)$$

$$pKa_T' = pKa + (2Z-1)\left(\frac{A\sqrt{I}}{1+\sqrt{I}} - 0.1I\right)$$

e) Return to Step c) and calculate the ionic strength again, but this time with the refined $pKa_T'$ value calculated in step d);
 f) Recalculate the temperature-corrected Debye Huckel modified $pKa_T'$ values again with the new ionic strength from step e).
 g) Repeat steps e) and f) until convergence the value of $pK_{aT}'$ is <0.0001 different from the value for $pK_{aT}'$ in the previous iteration
 h) Determine Acid Base ratio based on the pKaT' value achieved in step g) using the equations $$10^{pH-pKa} = R;$$

$$\text{Acid ratio = acid counter ion ratio} = \frac{1}{1+R}$$

$$\text{Base ratio = base counter ion ratio} = \frac{R}{1+R}$$

The mathematical model describing the relationship of ΔpH with additive concentration can be generated by methods known in the art, such as regression analysis, machine learning or artificial intelligence.

In many preferred embodiments, the temperature of the solution is selected to be in the range of from 10 to 30° C. In certain instances, the temperature is selected to be in the range of from 12 to 25° C., such as 18+/−5° C.

In many preferred embodiments, the solution has a concentration of acid and base of up to 1M, such as up to 0.5M, for example up to 250 mM preferably up to 150 mM. In many preferred embodiments, the solution has a concentration of from 5 to 100 mM, for example from 10 to 75 mM, such as 25 to 50 mM. In further preferred embodiments, the solution has a concentration of NaCl or KCl in the range of up to 3M, especially up to 2M, for example in the range of 0.1 mM to 1M. In other embodiments, where the additive is ammonium sulphate, the additive may be present at a concentration of up to about 3 to 4M. In further embodiments, when the additive is urea or guanidine hydrochloride, the additive may be present at a concentration at a concentration of up to about 7M.

In one especially preferred embodiments, the solution is a phosphate buffer, especially sodium dihydrogenphosphate/disodium hydrogenphosphate buffer, having a concentration of 10 to 100 mM. In another especially preferred embodiment, the solution is an acetate buffer, especially acetic acid/sodium acetate buffer, having a concentration of 10 to 250 mM. In another especially preferred embodiment, the solution is an MES buffer, especially 4-Morpholineethanesulfonic acid/4-Morpholineethanesulfonic acid sodium salt buffer, having a concentration of 10 to 100 mM. In another especially preferred embodiments, the solution is a HEPES buffer, especially 4-(2-Hydroxyethyl)piperazine-1-ethanesulfonic acid/4-(2-Hydroxyethyl)piperazine-1-ethanesulfonic acid sodium salt as base and as acid buffer, having a concentration of 10 to 100 mM. In another especially preferred embodiments, the solution is a tris buffer, especially tris in combination with tris.HCl buffer, having a concentration of 10 to 250 mM. In each of the foregoing especially preferred embodiments, each solution may additionally comprise up to 1M of salt, selected from one or both of NaCl and KCl.

The method of the present invention can be employed for the preparation of solutions for use in any application where solutions of defined composition are required, such as in high-throughput screening, chromatography, ultrafiltration, diafiltration, viral filtration, DNA purification, drug product formulation, manufacturing and laboratory research. The method is especially suitable for the processing of biomolecules, such as for the use in connection with the manufacture and purification of biologics, especially recombinant proteins.

In many preferred embodiments, the calculations of the acid and base concentrations to give a defined pH using the Henderson-Hasselbach equation in combination with the Debye Huckel theory; ΔpH; regression analysis of ΔpH against the additive concentration; ΔpH-corrected pH; and the concentrations of acid and base using the Henderson-Hasselbach equation in combination with the Debye Huckel theory using ΔpH-corrected pH are carried out using a suitably-programmed computer.

In many embodiments, the computer programme is linked to a user interface, commonly a Graphic User Interface, such as a table in a spreadsheet, a web interface or a data entry form where an operator can input details of the desired buffer. Such data input may comprise selecting the nature of one or more of the acid, base, buffer additives, pH, volume of buffer and buffer temperature from drop-down menus.

In certain embodiments, the computer programme provides alerts in the user interface when data entered into the data input falls outside the scope of one or more of parameters for which data has been entered into data tables. In some instances, one of the alerts is a warning that the chosen pH is outside a chosen range of the thermodynamic pKa for the buffer, for example outside the range of +/−1 of the thermodynamic pKa. Alerts may be provided if the temperature is selected to be outside a given range, for example greater than about 50° C., or the concentration of acid and base is outside a given range, for example the concentrations are too low to provide a meaningful buffer solution.

In preferred embodiments, the computer programme provides output to a user interface, commonly a Graphic User Interface, from which the operator can read the quantities of acid, base and buffer additive required to prepare the desired solution. In certain highly preferred embodiments, the user interface is an HTML graphic user interface, such as an HTML form. Examples of suitable computer programs are well known in the art, such as Python, Java, C, C++ and C#.

Apparatus, such as a suitably-programed computer, for carrying out steps a) and c) to h) of the first aspect of the present invention; steps a) to g) of the second aspect of the present invention; or steps a) to c) of the third aspect of the present invention forms a further aspect of the present invention.

Another aspect of the present invention comprises a computer program for carrying out steps a) and c) to h) of the first aspect of the present invention; steps a) to g) of the second aspect of the present invention; or steps a) to c) of the third aspect of the present invention.

In a further aspect, there is provided apparatus for preparing an aqueous solution comprising a metering device capable of feeding into a mixing device an acid and a base, one or more additives, and optionally a diluent, commonly water, wherein the proportions of acid, base and additive are determined by a method according to the first, second or third aspects of the present invention. Preferably, the acid, base and additive(s) are provided to the metering device in the form of solutions. The mixing device may provide the solution to a storage vessel for future use, or may provide the solution directly for use, such as to processing apparatus, especially bioprocessing apparatus, including chromatography, viral inactivation, filtration, refolding, ultrafiltration, diafiltration, microfiltration, in-line conditioning and refolding apparatus. In some embodiments, the metering device is operably connected to, and operates under the control of, apparatus, such as a suitably-programmed computer, for carrying out steps a) and c) to h) of the first aspect of the present invention; steps a) to g) of the second aspect of the present invention; or steps a) to c) of the third aspect of the present invention. In some further embodiments, the control apparatus, such as the suitably programmed computer, is integrated into the apparatus comprising the metering device, and preferably also comprising the mixing device. The metering device preferably comprises variable flow, preferably intermittent flow, inlet valves which regulate the flow through the metering device. Most preferably, the metering device comprises multiple inlet flow-controller comprising at least 2 inlet valves and in many instances comprise up to 8, such as 3, 4, 5, 6 or 7, inlet valves. The inlet valves may each have the same dimensions, or one or more of the inlet valves may have different dimensions. In certain preferred embodiments, the volume measured from each inlet valve to the outlet of the flow-controller is the same for each inlet, and it is highly preferred that both the volume and the path length measured from each inlet valve to the outlet of the flow-controller is the same for each inlet. The metering device advantageously comprises a pump located downstream of a multiple inlet flow-controller, and most preferably upstream of a mixing device, especially a static mixing device. In certain embodiments, the output from the mixing device is monitored by one or more sensors, such as pH, conductivity or flow meters.

The present invention is illustrated without limitation by the following Examples.

EXAMPLE 1

Preparation of Phosphate Buffers

A range of phosphate buffers were prepared having a range of different NaCl concentrations (0, 100, 250, 500, 1000, 2000 mM) and a range of different buffer concentrations (10, 25, 50, 100 mM) with target pH in each case being pH7.0 at a temperature of 20° C. The concentrations of acid and base to achieve these values were initially calculated using the Henderson-Hasselbach equation in combination with the Debye Huckel theory. Solutions were prepared in accordance with these values using concentrated stock solutions for each buffer component, 200 mM Sodium dihydrogen phosphate (acid), 200 mM disodium hydrogenphosphate (base) and 5M sodium chloride. The concentrations and quantities employed are given in Table 1 below.

TABLE 1

| | Buffer Conc (mM) | Base (mM) | Acid (mM) | Salt Conc (mM) | Stock Base (mL) | Stock Acid (mL) | Stock 5M salt Vol (mL) | water Vol (mL) |
|---|---|---|---|---|---|---|---|---|
| 1 | 10 | 4.81 | 5.19 | 0 | 2.4 | 2.6 | 0 | 95.0 |
| 2 | 25 | 13.25 | 11.75 | 0 | 6.6 | 5.9 | 0 | 87.5 |
| 3 | 50 | 28.69 | 21.31 | 0 | 14.3 | 10.7 | 0 | 75.0 |
| 4 | 100 | 61.7 | 38.3 | 0 | 30.9 | 19.2 | 0 | 50.0 |
| 5 | 10 | 5.81 | 4.19 | 100 | 2.9 | 2.1 | 2 | 93.0 |
| 6 | 25 | 14.9 | 10.1 | 100 | 7.5 | 5.1 | 2 | 85.5 |
| 7 | 50 | 30.7 | 19.3 | 100 | 15.4 | 9.7 | 2 | 73.0 |
| 8 | 100 | 63.54 | 36.46 | 100 | 31.8 | 18.2 | 2 | 48.0 |
| 9 | 10 | 6.27 | 3.73 | 250 | 3.1 | 1.9 | 5 | 90.0 |
| 10 | 25 | 15.82 | 9.18 | 250 | 7.9 | 4.6 | 5 | 82.5 |
| 11 | 50 | 31.98 | 18.02 | 250 | 16.0 | 9.0 | 5 | 70.0 |
| 12 | 100 | 64.77 | 35.23 | 250 | 32.4 | 17.6 | 5 | 45.0 |
| 13 | 10 | 6.49 | 3.51 | 500 | 3.2 | 1.8 | 10 | 85.0 |

TABLE 1-continued

| | Buffer Conc (mM) | Base (mM) | Acid (mM) | Salt Conc (mM) | Stock Base (mL) | Stock Acid (mL) | Stock 5M salt Vol (mL) | water Vol (mL) |
|---|---|---|---|---|---|---|---|---|
| 14 | 25 | 16.25 | 8.75 | 500 | 8.1 | 4.4 | 10 | 77.5 |
| 15 | 50 | 32.53 | 17.47 | 500 | 16.3 | 8.7 | 10 | 65.0 |
| 16 | 100 | 64.95 | 35.05 | 500 | 32.5 | 17.5 | 10 | 40.0 |
| 17 | 10 | 6.37 | 3.63 | 1000 | 3.2 | 1.8 | 20 | 75.0 |
| 18 | 25 | 15.87 | 9.13 | 1000 | 7.9 | 4.6 | 20 | 67.5 |
| 19 | 50 | 31.55 | 18.45 | 1000 | 15.8 | 9.2 | 20 | 55.0 |
| 20 | 100 | 62.27 | 37.73 | 1000 | 31.1 | 18.9 | 20 | 30.0 |
| 21 | 10 | 5.42 | 4.58 | 2000 | 2.7 | 2.3 | 40 | 55.0 |
| 22 | 25 | 13.45 | 11.55 | 2000 | 6.7 | 5.8 | 40 | 47.5 |
| 23 | 50 | 26.59 | 23.41 | 2000 | 13.3 | 11.7 | 40 | 35.0 |
| 24 | 100 | 51.94 | 48.06 | 2000 | 26.0 | 24.0 | 40 | 10.0 |

The pH value at 20° C. for the prepared buffers given in table were measured and the difference from theoretical value were calculated as delta pH. The results are given in Table 2, below.

TABLE 2

| | Measured pH | Delta pH |
|---|---|---|
| 1 | 7.03 | 0.03 |
| 2 | 7.02 | 0.02 |
| 3 | 7.02 | 0.02 |
| 4 | 7.02 | 0.02 |
| 5 | 6.93 | −0.07 |
| 6 | 6.95 | −0.05 |
| 7 | 6.95 | −0.05 |
| 8 | 6.96 | −0.04 |
| 9 | 6.85 | −0.15 |
| 10 | 6.87 | −0.13 |
| 11 | 6.88 | −0.12 |
| 12 | 6.87 | −0.13 |
| 13 | 6.72 | −0.28 |
| 14 | 6.74 | −0.26 |
| 15 | 6.75 | −0.25 |
| 16 | 6.73 | −0.27 |
| 17 | 6.51 | −0.49 |
| 18 | 6.5 | −0.5 |
| 19 | 6.5 | −0.5 |
| 20 | 6.48 | −0.52 |
| 21 | 6.03 | −0.97 |
| 22 | 6.03 | −0.97 |
| 23 | 6.02 | −0.98 |
| 24 | 5.99 | −1.01 |

Linear regression analysis of the value of delta pH (y) against salt concentration (x) generates the equation (1):

$$y = -0.0005x$$

Equation (1) was employed to calculate the delta pH value for the salt concentrations for each of the phosphate buffers A, B, C and D given in Table 3 below, and the values of delta pH so calculated used to calculate the delta-pH-corrected pH for each of the buffers.

The delta-pH corrected pH for each of the salt concentrations was then employed to calculate the concentrations of acid, base and salt to achieve these values using the Henderson-Hasselbach equation in combination with the Debye Huckel theory, and the concentrations are also given in Table 3.

TABLE 3

| | Target pH | Buffer Conc (mM) | Base (mM) | Acid (mM) | Salt Conc (mM) | Stock Base (mL) | Stock Acid (mL) | 5M salt Vol (mL) | water (mL) |
|---|---|---|---|---|---|---|---|---|---|
| A | 7.0 | 20 | 11.58 | 8.42 | 50 | 5.8 | 4.2 | 1 | 89.0 |
| B | 7.0 | 60 | 48.62 | 11.38 | 750 | 24.3 | 5.7 | 15 | 55.0 |
| C | 6.5 | 50 | 25.57 | 24.43 | 500 | 12.8 | 12.2 | 10 | 65.0 |
| D | 7.5 | 25 | 21.05 | 3.95 | 100 | 10.5 | 2.0 | 2 | 85.5 |

Buffers were prepared using the stock acid, base and salt solution employed to generate the data in Table 1 in the quantities given in Table 3, and the pH values obtained were measured at 20° C. The pH values achieved are given in Table 4.

TABLE 4

| | Measured pH | Target pH |
|---|---|---|
| A | 7.07 | 7.0 |
| B | 7.03 | 7.0 |
| C | 6.47 | 6.5 |
| D | 7.52 | 7.5 |

All pH value were within the range of +/−0.1 pH unit of the target value, indicating the high the accuracy of the method of the present invention.

EXAMPLE 2

Preparation of Acetate Buffers

A range of acetate buffers were prepared having a range of different NaCl concentrations (0, 100, 250, 500, 1000, 2000 mM) and a range of different buffer concentrations (10, 25, 50, 100 mM) with target pH in each case being pH4.5 at a temperature of 20° C. The concentrations of acid and base to achieve these values were initially calculated using the Henderson-Hasselbach equation in combination with the Debye Huckel theory. Solutions were prepared in accordance with these values using concentrated stock solutions for each buffer component, 200 mM acetic acid (acid), 200 mM sodium acetate (base) and 5M sodium chloride. The concentrations and quantities employed are given in Table 5 below.

TABLE 5

| | Buffer Conc (mM) | Base (mM) | Acid (mM) | Salt Conc (mM) | Base (mL) | Acid (mL) | 5M salt Vol (mL) | water (mL) |
|---|---|---|---|---|---|---|---|---|
| 1 | 10 | 3.69 | 6.31 | 0 | 1.8 | 3.2 | 0 | 95.0 |
| 2 | 25 | 9.44 | 15.56 | 0 | 4.7 | 7.8 | 0 | 87.5 |
| 3 | 50 | 19.31 | 30.69 | 0 | 9.7 | 15.3 | 0 | 75.0 |
| 4 | 100 | 39.75 | 60.25 | 0 | 19.9 | 30.1 | 0 | 50.0 |
| 5 | 10 | 4.16 | 5.84 | 100 | 2.1 | 2.9 | 2 | 93.0 |
| 6 | 25 | 10.42 | 14.58 | 100 | 5.2 | 7.3 | 2 | 85.5 |
| 7 | 50 | 20.94 | 29.06 | 100 | 10.5 | 14.5 | 2 | 73.0 |
| 8 | 100 | 42.21 | 57.79 | 100 | 21.1 | 28.9 | 2 | 48.0 |
| 9 | 10 | 4.33 | 5.67 | 250 | 2.2 | 2.8 | 5 | 90.0 |
| 10 | 25 | 10.85 | 14.15 | 250 | 5.4 | 7.1 | 5 | 82.5 |
| 11 | 50 | 21.73 | 28.27 | 250 | 10.9 | 14.1 | 5 | 70.0 |
| 12 | 100 | 43.58 | 56.42 | 250 | 21.8 | 28.2 | 5 | 45.0 |
| 13 | 10 | 4.42 | 5.58 | 500 | 2.2 | 2.8 | 10 | 85.0 |
| 14 | 25 | 11.06 | 13.94 | 500 | 5.5 | 7.0 | 10 | 77.5 |
| 15 | 50 | 22.12 | 27.88 | 500 | 11.1 | 13.9 | 10 | 65.0 |
| 16 | 100 | 44.26 | 55.74 | 500 | 22.1 | 27.9 | 10 | 40.0 |
| 17 | 10 | 4.38 | 5.62 | 1000 | 2.2 | 2.8 | 20 | 75.0 |

TABLE 5-continued

| | Buffer Conc (mM) | Base (mM) | Acid (mM) | Salt Conc (mM) | Base (mL) | Acid (mL) | 5M salt Vol (mL) | water (mL) |
|---|---|---|---|---|---|---|---|---|
| 18 | 25 | 10.96 | 14.04 | 1000 | 5.5 | 7.0 | 20 | 67.5 |
| 19 | 50 | 21.9 | 28.1 | 1000 | 11.0 | 14.1 | 20 | 55.0 |
| 20 | 100 | 43.75 | 56.25 | 1000 | 21.9 | 28.1 | 20 | 30.0 |
| 21 | 10 | 4.07 | 5.93 | 2000 | 2.0 | 3.0 | 40 | 55.0 |
| 22 | 25 | 10.16 | 14.84 | 2000 | 5.1 | 7.4 | 40 | 47.5 |
| 23 | 50 | 20.3 | 29.7 | 2000 | 10.2 | 14.9 | 40 | 35.0 |
| 24 | 100 | 40.51 | 59.49 | 2000 | 20.3 | 29.7 | 40 | 10.0 |

The pH value at 20° C. for the prepared buffers given in table were measured and the difference from theoretical value were calculated as delta pH. The results are given in Table 6, below.

TABLE 6

| | Measured pH | Delta pH |
|---|---|---|
| 1 | 4.48 | −0.03 |
| 2 | 4.48 | −0.04 |
| 3 | 4.49 | −0.03 |
| 4 | 4.5 | −0.03 |
| 5 | 4.46 | −0.07 |
| 6 | 4.45 | −0.08 |
| 7 | 4.45 | −0.07 |
| 8 | 4.46 | −0.06 |
| 9 | 4.45 | −0.08 |
| 10 | 4.42 | −0.11 |
| 11 | 4.43 | −0.1 |
| 12 | 4.44 | −0.09 |
| 13 | 4.39 | −0.17 |
| 14 | 4.38 | −0.15 |
| 15 | 4.39 | −0.14 |
| 16 | 4.4 | −0.13 |
| 17 | 4.34 | −0.24 |
| 18 | 4.32 | −0.23 |
| 19 | 4.33 | −0.23 |
| 20 | 4.34 | −0.21 |
| 21 | 4.2 | −0.39 |
| 22 | 4.2 | −0.37 |
| 23 | 4.2 | −0.36 |
| 24 | 4.22 | −0.37 |

Linear regression analysis of the value of delta pH (y) against salt concentration (x) generates the equation (1):

$Y = -0.0002x - 0.0516$

Equation (1) was employed to calculate the delta pH value for the salt concentrations for each of the buffers E to M given in Table 7 below, and the values of delta pH so calculated used to calculate the delta-pH-corrected pH for each of the buffers.

The delta-pH corrected pH for each of the salt concentrations was then employed to calculate the concentrations of acid, base and salt to achieve these values using the Henderson-Hasselbach equation in combination with the Debye Huckel theory, and the concentrations are also given in Table 7.

TABLE 7

| | Target pH | Buffer Conc (mM) | Base (mM) | Acid (mM) | Salt Conc (mM) | Base (mL) | Acid (mL) | 5M salt Vol (mL) | water (mL) |
|---|---|---|---|---|---|---|---|---|---|
| E | 4.5 | 20 | 8.66 | 11.34 | 50 | 4.3 | 5.7 | 1 | 89.0 |
| F | 4.5 | 60 | 32.51 | 27.49 | 750 | 16.3 | 13.7 | 15 | 55.0 |
| G | 4.0 | 50 | 12.72 | 37.28 | 500 | 6.4 | 18.6 | 10 | 65.0 |
| H | 5.0 | 25 | 18.09 | 6.91 | 100 | 9.0 | 3.5 | 2 | 85.5 |

Buffers were prepared having the concentrations given in Table 7, and the pH were measured at 20° C. The pH values achieved are given in Table 8.

TABLE 8

| | Measured pH | Target pH |
|---|---|---|
| E | 4.47 | 4.5 |
| F | 4.44 | 4.5 |
| G | 3.93 | 4.0 |
| H | 4.98 | 5.0 |

All pH value were within the range of +/−0.1 pH unit of the target value, indicating the high the accuracy of the method of the present invention.

The invention claimed is:

1. A method for preparing an aqueous solution of a defined pH comprising an acid, a base and one or more additives, wherein the method comprises the steps of:
   a) calculating theoretical concentrations of acid and base for each of a plurality of solutions having a theoretical pH corresponding to the defined pH, and each of the plurality of solutions having a different additive concentration within a range of different additive concentrations, wherein said calculating is carried out using the Henderson-Hasselbach equation in combination with the Debye Huckel theory;
   b) preparing the plurality of solutions and measuring an actual pH for each solution having a different additive concentration within the range of different additive concentrations;
   c) for each solution, calculating a value for delta pH, ΔpH, being the difference between the theoretical pH and the actual pH;
   d) generating a mathematical model describing a relationship of ΔpH with additive concentration;
   e) selecting the defined pH and additive concentration for the aqueous solution to be prepared;
   f) using the mathematical model generated in step d) to calculate ΔpH for the selected defined pH and additive concentration;
   g) calculating a ΔpH-corrected pH by summing the defined pH and ΔpH;
   h) using the ΔpH-corrected pH to calculate concentrations of acid and base for the preparation of the aqueous solution including the additive by using the Henderson-Hasselbach equation in combination with the Debye Huckel theory; and
   i) preparing the aqueous solution including the one or more additives using the concentrations of acid and base calculated in step h).

2. A method for preparing an aqueous solution of a defined pH comprising an acid, a base and one or more additives, wherein the method comprises the steps of:
   a) calculating theoretical concentrations of acid, base and additive for each of a plurality of solutions having a theoretical pH corresponding to the defined pH, and each of the plurality of solutions having a different additive concentration within a range of different additive concentrations, wherein said calculating is carried out using the Henderson-Hasselbach equation in combination with the Debye Huckel theory;

b) for each solution, calculating a value for ΔpH, being the difference between the theoretical pH and a value for actual pH, for each of the plurality of solutions having a different additive concentration;

c) generating a mathematical model describing a relationship of ΔpH with additive concentration;

d) selecting the defined pH and additive concentration for the aqueous solution to be prepared;

e) using the mathematical model generated in step c) to calculate ΔpH for the defined pH and additive concentration;

f) calculating a ΔpH-corrected pH by summing the defined pH and ΔpH;

g) using the ΔpH-corrected pH to calculate concentrations of acid and base for the preparation of the aqueous solution including the additive by using the Henderson-Hasselbach equation in combination with the Debye Huckel theory; and h) preparing the aqueous solution including the one or more additives using the concentrations of acid and base calculated in step g).

3. A method for preparing an aqueous solution of a defined pH, comprising an acid, a base and an additive, wherein the method comprises the steps of:

a) calculating a theoretical pH for the aqueous solution using the Henderson-Hasselbach equation in combination with the Debye Huckel theory;

b) calculating a ΔpH-corrected pH for the aqueous solution by comparing the theoretical pH with a pH value calculated from an equation determined from a mathematical model of the difference between the theoretical pH and a value for actual pH of each of a plurality of solutions having a different additive concentration within a range of different additive concentrations;

c) using the ΔpH-corrected pH to calculate concentrations of acid and base for the preparation of the aqueous solution including the additive using the Henderson-Hasselbach equation in combination with the Debye Huckel theory; and d) preparing the aqueous solution including the additive using the concentrations of acid and base calculated in step c).

4. The method according to claim 1, wherein the aqueous solution is a buffer.

5. The method according to claim 4, wherein the buffer is selected from the group consisting of tris buffers; sodium phosphate buffers; potassium phosphate buffers; sodium acetate buffers; MES buffers; and HEPES buffers.

6. The method according to claim 1, wherein the one or more additives are salts selected from the group consisting of NaCl, KCl, $Na_2SO_4$, $(NH_4)_2SO_4$ and $(NH_4)_3PO_4$ and mixtures thereof.

7. The method according to claim 6, wherein the salts are at a concentration of up to about 2M.

8. The method according to claim 1, wherein a minimum additive concentration in the range of additive concentrations is selected to be below, and a maximum additive concentration in the range of additive concentrations is selected to be above, the additive concentration of the aqueous solution to be prepared.

9. The method according to claim 1, wherein the range of additive concentrations comprises from 5 to 10 data points.

10. The method according to claim 1, wherein the defined pH is selected to be within 1 unit of the solution's thermodynamic pKa value.

11. An apparatus for preparing an aqueous solution of a defined pH, wherein the apparatus comprises a metering device capable of feeding into a mixing device an acid, a base, and one or more additives, wherein the metering device operates under control of control apparatus for a) calculating theoretical concentrations of acid and base for each of a plurality of solutions having a theoretical pH corresponding to the defined pH, and each of the plurality of solutions having a different additive concentration within a range of different additive concentrations, wherein said calculating is carried out using the Henderson-Hasselbach equation in combination with the Debye Huckel theory;

b) for each solution, calculating a value for delta pH, ΔpH, being the difference between the theoretical pH and the actual pH;

c) generating a mathematical model describing a relationship of ΔpH with additive concentration;

d) selecting the defined pH and additive concentration for the aqueous solution to be prepared;

e) using the mathematical model generated in step d) to calculate ΔpH for the selected defined pH and additive concentration;

f) calculating a ΔpH-corrected pH by summing the defined pH and ΔpH;

g) using the ΔpH-corrected pH to calculate concentrations of acid and base for the preparation of the aqueous solution including the one or more additives by using the Henderson-Hasselbach equation in combination with the Debye Huckel theory.

12. The apparatus according to claim 11, wherein the apparatus further comprises a means for carrying out a bioprocessing operation.

13. The apparatus according to claim 12, wherein the bioprocessing operation comprises chromatography, viral inactivation, filtration, refolding, ultrafiltration, diafiltration, microfiltration, in-line conditioning or refolding.

14. The apparatus according to claim 11, wherein the metering device comprises a pump located downstream of a multiple inlet flow-controller and upstream of a mixing device.

15. The method according to claim 2, wherein the value for the actual pH in step b) is a predetermined value.

16. The method according to claim 3, wherein the value for the actual pH in step b) is a predetermined value.

17. An apparatus for preparing an aqueous solution of a defined pH, wherein the apparatus comprises a metering device capable of feeding into a mixing device an acid, a base, and one or more additives, wherein the metering device operates under control of control apparatus for a) calculating theoretical concentrations of acid, base and additive for each of a plurality of solutions having a theoretical pH corresponding to the defined pH, and each of the plurality of solutions having a different additive concentration within a range of different additive concentrations, wherein said calculating is carried out using the Henderson-Hasselbach equation in combination with the Debye Huckel theory;

b) for each solution, calculating a value for ΔpH, being the difference between the theoretical pH and a value for actual pH, for each of the plurality of solutions having a different additive concentration;

c) generating a mathematical model describing a relationship of ΔpH with additive concentration;

d) selecting the defined pH and additive concentration for the aqueous solution to be prepared;

e) using the mathematical model generated in step c) to calculate ΔpH for the defined pH and additive concentration;

f) calculating a ΔpH-corrected pH by summing the defined pH and ΔpH;

g) using the ΔpH-corrected pH to calculate concentrations of acid and base for the preparation of the aqueous solution including the one or more additives by using the Henderson-Hasselbach equation in combination with the Debye Huckel theory.

18. The apparatus according to claim 17, wherein the apparatus further comprises a means for carrying out a bioprocessing operation.

19. The apparatus according to claim 18, wherein the bioprocessing operation comprises chromatography, viral inactivation, filtration, refolding, ultrafiltration, diafiltration, microfiltration, in-line conditioning or refolding.

20. The apparatus according to claim 17, wherein the metering device comprises a pump located downstream of a multiple inlet flow-controller and upstream of a mixing device.

21. An apparatus for preparing an aqueous solution, wherein the apparatus comprises a metering device capable of feeding into a mixing device an acid, a base, and one or more additives, wherein the metering device operates under control of control apparatus for a) calculating a theoretical pH for the aqueous solution using the Henderson-Hasselbach equation in combination with the Debye Huckel theory;

b) calculating a ΔpH-corrected pH for the aqueous solution by comparing the theoretical pH with a pH value calculated from an equation determined from a mathematical model of the difference between the theoretical pH and a value for actual pH of each of a plurality of solutions having a different additive concentration within a range of different additive concentrations;

c) using the ΔpH-corrected pH to calculate concentrations of acid and base for the preparation of the aqueous solution including the one or more additives using the Henderson-Hasselbach equation in combination with the Debye Huckel theory.

22. The apparatus according to claim 21, wherein the apparatus further comprises a means for carrying out a bioprocessing operation.

23. The apparatus according to claim 22, wherein the bioprocessing operation comprises chromatography, viral inactivation, filtration, refolding, ultrafiltration, diafiltration, microfiltration, in-line conditioning or refolding.

24. The apparatus according to claim 21, wherein the metering device comprises a pump located downstream of a multiple inlet flow-controller and upstream of a mixing device.

25. The method of claim 1 wherein the defined pH is 3.5 to 9.

26. The method according to claim 3, wherein the aqueous solution is a buffer.

27. The method according to claim 26, wherein the buffer is selected from the group consisting of tris buffers; sodium phosphate buffers; potassium phosphate buffers; sodium acetate buffers; MES buffers; and HEPES buffers.

28. The method according to claim 3, wherein the additive is a salt selected from the group consisting of NaCl, KCl, $Na_2SO_4$, $(NH_4)_2SO_4$ and $(NH_4)_3PO_4$.

29. The method according to claim 28, wherein the salt is at a concentration of up to about 2M.

30. The method according to claim 3, wherein a minimum additive concentration in the range of additive concentrations is selected to be below, and a maximum additive concentration in the range of additive concentrations is selected to be above, the additive concentration of the aqueous solution to be prepared.

31. The method according to claim 3, wherein the range of additive concentrations comprises from 5 to 10 data points.

32. The method according to claim 3, wherein the defined pH is selected to be within 1 unit of the solution's thermodynamic pKa value.

\* \* \* \* \*